July 22, 1941.　　　A. V. DITTY ET AL　　　2,250,297

PICTURE PROJECTOR APPARATUS

Filed Sept. 22, 1938　　　2 Sheets-Sheet 1

Inventors
Allan V. Ditty,
Arthur J. Bradford,
Attorneys

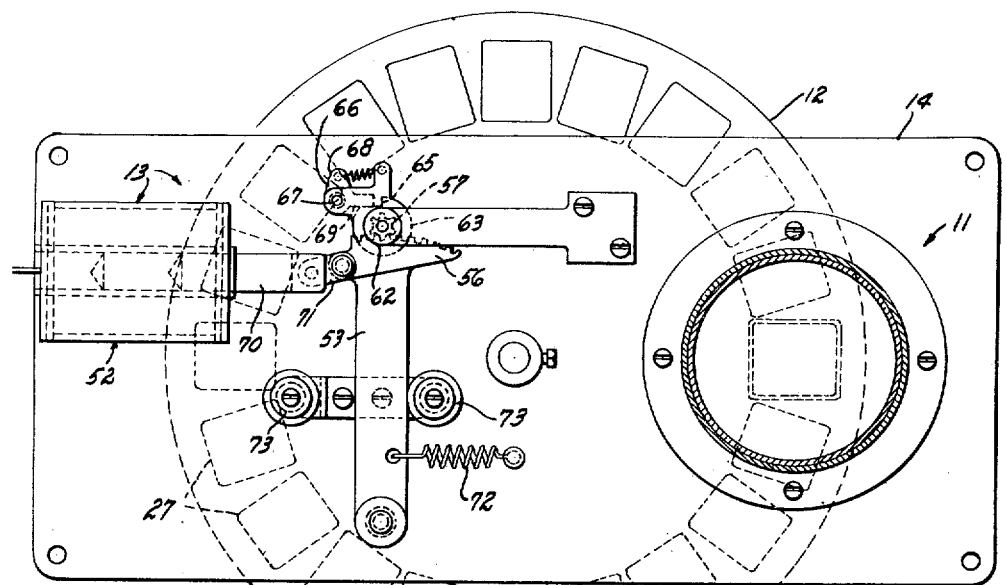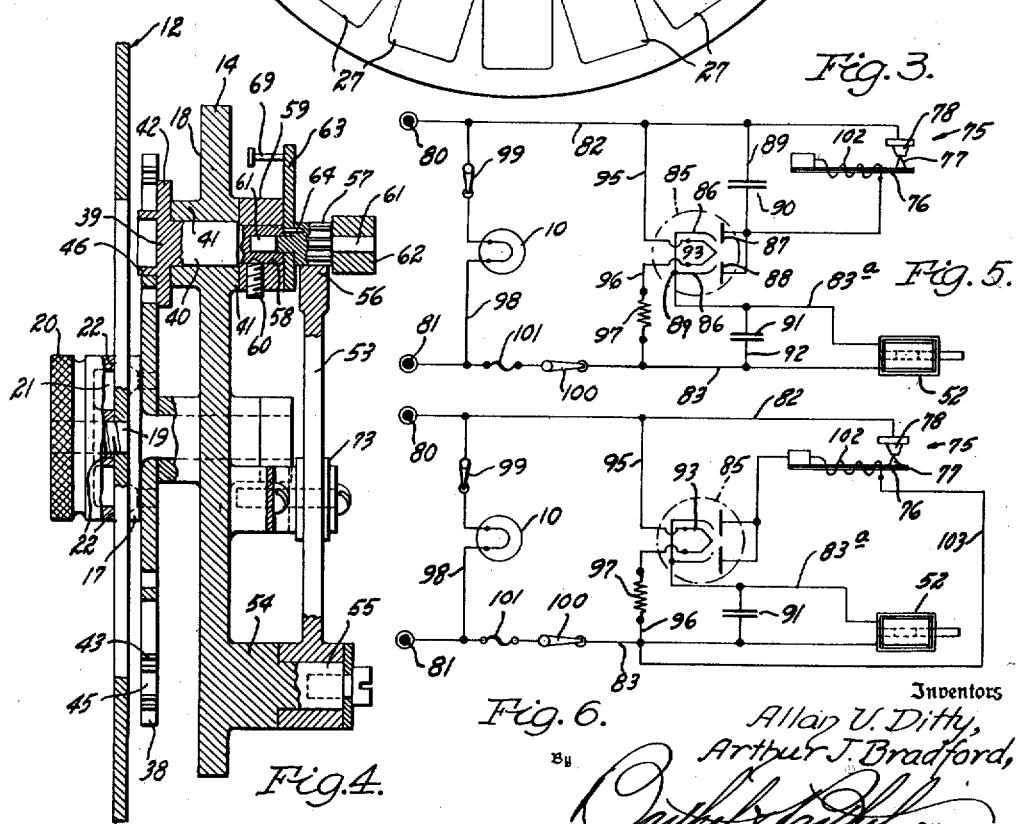

Patented July 22, 1941

2,250,297

UNITED STATES PATENT OFFICE 2,250,297

PICTURE PROJECTOR APPARATUS

Allan V. Ditty, Detroit, and Arthur J. Bradford, Grosse Pointe Park, Mich., assignors to Motion Picture Engineering Co., Detroit, Mich., a corporation of Michigan Application September 22, 1938, Serial No. 231,178

2 Claims. (Cl. 88—27)

This invention relates generally to photographic projector apparatus and more particularly to a projector apparatus for projecting a plurality of photographs continuously and successively at regular time intervals.

One of the objects of the present invention is to provide a new and improved photographic projector apparatus for projecting a plurality of photographs continuously and successively at regular time intervals.

Another object of the invention resides in a new and improved intermittently operable actuating mechanism for a photographic projector apparatus.

Another object of the invention is to provide a photographic projector apparatus having a new and improved arrangement of the operating parts thereof.

Another object of the invention is to provide an apparatus of the above mentioned character which is efficient in operation, inexpensive to operate and one which will need little or no attention or repairs.

Other objects of the invention will become apparent from the following description taken in connection with the accompanying drawings in which Figure 1 is a top plan view of our photographic projector apparatus;

Fig. 3 is a rear view in elevation of the projector apparatus;

Fig. 4 is a view shown in cross section of the apparatus, taken along the line and in the direction of the arrows 4—4 of Fig. 2;

Fig. 5 is a diagrammatic view of an electrical circuit for the apparatus, and

Fig. 6 is a diagrammatic view of a modified form of electrical circuit for the apparatus.

Figure 1:
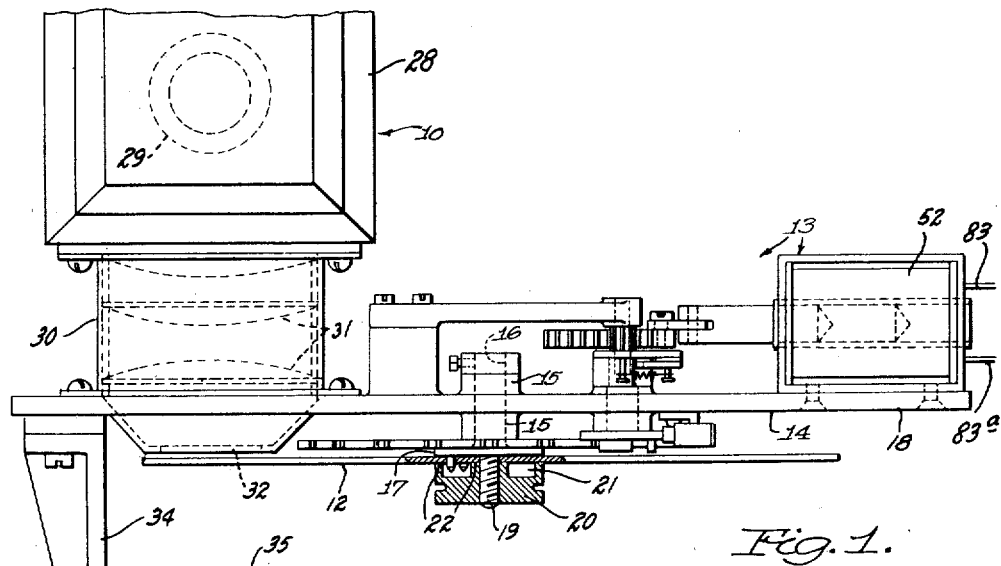
Figure 2:
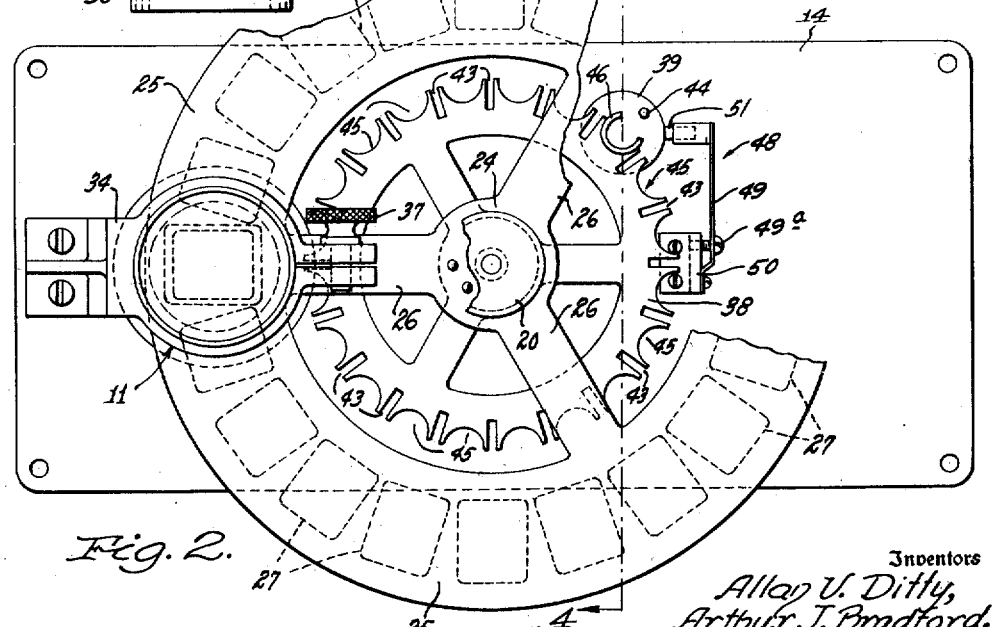
Fig. 2 is a front view in elevation and partly broken away of the projector apparatus.

Referring to the drawings by characters of reference, the present apparatus comprises in general, a lamp 10, a projector lens 11, a rotatable photographic projector plate 12 and mechanism designated generally by the numeral 13 for actuating the rotatable plate 12. The lamp 10, lens 11, plate 12 and actuating mechanism therefor are all mounted on a supporting or mounting plate 14 as a unitary structure which, it is to be understood, is to be mounted in a casing or housing (not shown). The mounting plate 14 is provided centrally thereof with integral, aligning hollow bosses 15 which project from opposite sides of the mounting plate 14 and rotatably support a driven shaft 16 on which the photographic projector plate 12 is mounted for rotation therewith. Intermediate its ends, the shaft 16 is provided with an external annular abutment flange 17, in advance of the front side, as at 18, of the mounting board 14, and the plate 12 is provided with a central aperture to receive an outer reduced end portion 19 of the shaft, the plate 12 being drawn down tightly against the abutment flange 17 by a nut 20 threaded onto the outer reduced end portion 19 of the shaft. One or the abutting end of the nut 20 is formed with an annular recess 21 providing an interrupted surface comprising spaced concentric surfaces 22 for abutment with the outer surface of the photographic projector plate 12 to hold tightly the plate 12 to the driven shaft 16. The photographic projector plate 12 may be formed of any suitable light transmitting or transparent material and is preferably formed of a plastic material which may be placed under slight tension by the nut 20 to lock the nut against accidental loosening on the shaft.

The photographic projector plate 12 may be formed having a central hub portion 24 and an outer rim or border portion 25 integrally connected by radially extending spokes 26. Around the border portion 25 of the plate 12, is provided a light sensitive emulsion which through photographic process is sensitized to provide a plurality of circumferentially spaced photographs, designated by the numeral 27. During operation of the apparatus, the sensitized plate 12 is intermittently and continuously rotated sufficiently to successively align the photographs thereon with the lamp 10 and lens 11.

The lamp 10 is rigidly mounted on the mounting plate 14 rearward thereof and includes a casing 28 for enclosing a light source 29 which may be an electric light bulb. Extending from the casing 28, a housing 30, enclosing spaced condensing lenses 31, projects through an opening in the mounting plate 14 and is provided in its outer end with an opening 32 for the light rays. As shown, the outer end of the housing 30 is disposed toward and in close proximity to the rear surface of the photographic projector plate 12, the housing opening 32 aligning or overlying the path of rotation of the photographs 27.

The lens 11 may be of any suitable type of focusing lens and may be rigidly mounted on the mounting plate 14 in advance thereof by a bracket 34. The lens is enclosed and supported by an open ended tube 35 which is aligned with the lamp opening 32 and the bracket 34 is provided with a split strap 36 which surrounds and is clamped to the lens tube 35 by a screw 37 to provide for adjustment of the position of the lens to focus the same.

Preferably, the operating mechanism for intermittently rotating the photographic projector plate 12 includes a so-called Geneva motion mechanism which comprises the usual driven wheel 38 and rotatable drive member 39. The driven wheel 38 is mounted on the driven shaft 16, intermediate the photographic plate 12 and the mounting plate 16 and may be rigidly secured to the shaft flange 17 by screws, or by other suitable means. The drive member 39 is disposed between the wheel 38 and the mounting plate 14 adjacent the outer periphery of the wheel, and is provided with a shaft 40 journaled for rotation in aligned hollow bosses 41, integral with and projecting from opposite sides of the mounting plate 14. Immediately adjacent the rear surface of the wheel 38, the drive member 39 is provided with an external annular flange 42, integral of the shaft 40. The outer periphery of the driven wheel 38 is provided with a plurality of equally spaced, radially extending elongated notches 43 and carried by the drive member 39 and extending forwardly of the flange 42 thereof, a pin 44, offset from the axis of the shaft 40, is adapted to engage successively in the wheel notches 43 to rotate the wheel intermittently. The wheel 38 is also provided in its outer periphery with a plurality of equally spaced notches 45, interposed between the notches 43, providing concave bearing surfaces in which a bearing member 46 integral with and extending forwardly of the drive member flange 42 is adapted to engage to steady the wheel 38 between intermittent operations thereof.

In order to insure against slight movement or back lash of the photographic projector plate 12, a brake 48 is provided for stopping and holding the drive member 39 against movement. The brake 48 comprises a flexible tensioned arm 49 which is anchored or secured at one or its lower end to a block 50 which may be rigidly secured to the supporting plate 14 by screws or by other suitable means, and secured to the other or upper end of the tensioned arm 49 is a brake shoe 51 engaging the outer periphery of the drive member flange 42. The tension of the arm 49 may be adjusted by an adjustment screw 49a threaded into the block 50 with the head of the screw abutting the flexible arm 49.

In order to provide an efficient photographic projection apparatus and one which will require little or no attention or repairs, the Geneva motion mechanism is actuated by an intermittently energized solenoid 52 which may be mounted on the mounting plate 14 on the rear side thereof, opposite the lamp 10. The solenoid 52 may be of any suitable type and is operatively connected to the Geneva motion mechanism by connecting mechanism which may include a lever 53. Integral with and projecting rearwardly of the mounting plate 14, a boss 54 has a reduced end portion 55 providing a fixed shaft or pivot to which the lower end of the lever 53 is pivoted, the upper end of the lever 53 being provided with an upwardly facing integral gear rack 56 which meshes with and rotates a pinion gear 57 to rotate the drive member 39 of the Geneva motion mechanism. The drive member shaft 40 extends rearwardly of the supporting plate 14 and is provided with a reduced end portion 58 which receives a collar 59 secured thereto by a set screw 60 to prevent longitudinal or axial movement of the drive member 39, this collar also serving as a ratchet. The pinion gear 57 is provided with oppositely extending shafts or pins 61 one of which is received in an axial bore in and opening through the rear of the drive member shaft 40, the other shaft 61 preferably being journaled in a bracket 62 which may be rigidly secured to the mounting plate 14. Interposed between the collar 59 and the lever 53, the plate-like lever member 63 is provided having an aperture to receive the inner pinion gear shaft 61 to which the member 63 is attached for rotation therewith by a pin 64. The collar or ratchet 59 may be provided with a single tooth or abutment 65 for engagement by a pawl 66 which is carried by and pivoted, as at 67, to the lever member 63. The pawl 66 is provided with a pair of radially spaced arms 67 one of which is held in contact with the collar in alignment with the tooth or abutment 65 by a helical coil spring 68 one end of which is attached to the other pawl arm, the other end of the spring being attached to a pin 69 secured to and extending laterally from the lever member 63.

The movable solenoid core, as at 70, is pivotally connected to the lever 53, adjacent the upper end thereof, by a link 71 and the lever 53 is retracted upon deenergization of the solenoid by a helical coil spring 72, one end of which is attached to the lever and the other end of which is anchored to the mounting plate 14. A pair of spaced bumpers 73 between which the lever 53 extends is provided to limit pivoting movement of the lever in opposite directions and may be formed of rubber or other sound deadening material and be mounted on the mounting plate 14 in any suitable manner.

Referring now to Fig. 5 which shows an electric circuit for the electrical devices of our apparatus, the numeral 75 designates in general, a thermostatic switch which may be of any suitable type and comprises a bi-metal switch blade 76 carrying a contact 77 cooperable with a contact 78 to control operation of the solenoid 52. Represented at 80 and 81 are terminals which may be the terminals of the usual or conventional wall plug, and the thermostatic switch contact 78 is connected to the plug terminal 80 by a lead wire 82. One terminal of the solenoid 52 is connected to the other plug terminal by a lead wire 83 and the other terminal of the solenoid is connected by a lead wire 83a to a terminal 84 of a rectifier tube 85 having emitters or cathodes 86 respectively positioned adjacent plates 87 and 88 of the rectifier tube. The rectifier plates 87 and 88 are connected together and to the lead wire 82 by a lead wire 89 in which a condenser 90 is preferably provided. Also, a condenser 91 is preferably provided in a lead wire 92 which connects lead wires 83 and 83a. The rectifier tube includes the usual heater 93 from which lead wires 95 and 96 connect to the lead wire 82 and 83 respectively, and in the lead wire 96 a resistance 97 may be provided. Also connecting the lead wires 82 and 83 between the plug and the rectifier tube is a lead wire 98 in which the lamp 10 is connected and also in the lead wire 96 a manually operable switch 99 may be provided. A manually operable switch 100 may be provided in the lead wire 83 to open and/or close the circuit controlled by the thermostat and also in this line a fuse 101 may be provided. In heat transfer relation with the thermotsatic blade 76 is a heater 102 in the form of a resistance coil having one end connected to the blade 76 and the other end connected to the lead wire 89. The heater is energized in closing of the circuit by the thermostatic blade 76 to quickly heat the blade to open the circuit. In this circuit of Fig. 5, it will be seen that the thermostatic switch 76, rectifier tube 85, and the solenoid 52 are all in series circuit and the lamp 10 is in parallel circuit therewith. The circuit of Fig. 6 differs from the circuit of Fig. 5 only in that the thermostatic switch 75 and heater 102 are in parallel or shunt circuit with the rectifier tube 85, the heater coil 102 being connected to the lead wire 83 by a lead wire 103.

The operation of the apparatus is as follows: When the plug, represented by the terminals 80, 81, is connected to a power line and manual switches 99 and 100 are closed as shown in Figs. 5 and 6, the lamp 10 will be lighted and the heater 93 of the rectifier tube will be energized and begin to heat. The thermostatic blade 76 will be in contact with its cooperating contact member 78, holding the circuit of the solenoid 52 closed which solenoid will be energized. Also, the heater 102 will heat up and affect the thermostatic blade 76 which will at a predetermined desired temperature open the circuit of and de-energize the solenoid 52 and the heater 102 on cooling permits the blade 76 to again close the circuit of the solenoid actuator 52. Thus, it will be seen that the solenoid 52 is energized at regular time intervals and these time intervals may be selected, as desired. When the solenoid is energized, its movable core or armature 70 is pulled to the left, Fig. 3, which pivots lever 53 in a counterclockwise direction against the action of the spring 72 and rotates the ratchet 63 in a clockwise direction. Upon predetermined movement of the ratchet 63, the pawl engages the ratchet, this lost motion being provided for to permit the core 70 to gain momentum before picking up the load. The shaft 40 is rotated and the drive member 39 rotates the wheel 38 through a predetermined angle rotating the photographic projector plate 12 to bring the next photograph in line for projection after which the lever and pawl and ratchet are retracted by the spring 72. Thus, as the solenoid 52, under control of the thermostatic switch 75 is intermittently energized, the photographic projector plate 12 is intermittently rotated to present continuously and successively the photographs on the plate in alignment with the lens and lamp for projection.

What we claim is:

1. In an apparatus of the character described, a mounting plate, a photographic projector plate rotatably mounted on said mounting plate in spaced relation to one side thereof, said projector plate having a plurality of circumferentially spaced transparent photographs for successive projection, a light source enclosed in a housing mounted on said mounting plate on the other side thereof from said projector plate, said housing having an opening for light rays aligning with an opening in said mounting plate, a lens mounted on said mounting plate on said one side thereof and in advance of said projector plate, said lens being arranged to align with the photographs as they are successively presented thereto, a Geneva motion mechanism mounted on said mounting plate, said mechanism including a driven wheel positioned between said projector plate and said mounting plate and operatively connected to said projector plate, and means including a solenoid actuator mounted on said mounting plate on said one side thereof and operable for intermittently actuating said Geneva motion mechanism.

2. In an apparatus of the character described, a supporting plate having a pair of spaced bores therethrough, a shaft rotatably mounted in one of said bores, a Geneva motion wheel secured to said shaft for rotation therewith and spaced from one side of said supporting plate, an operating member for said wheel and having a stub shaft journaled in the other of said bores, a photographic projector plate secured to said first-named shaft in advance of said wheel and having circumferentially spaced photographs for successive projections, means for intermittently rotating said second-named shaft including a pawl and a ratchet mounted thereon rearwardly of said supporting plate, an intermittently energized electro-magnet mounted on said supporting plate rearwardly thereof, a light source mounted on said supporting plate rearwardly thereof, a casing for said light source having an open end projecting through an aperture in the path of rotation of the photographs, a lens mounted on said supporting plate in advance thereof and in alignment with said light source, and means mounted on said supporting plate rearwardly thereof and operatively connecting said ratchet and said electro-magnet.

ALLAN V. DITTY.
ARTHUR J. BRADFORD.